United States Patent [19]
Martin et al.

[11] Patent Number: 5,971,666
[45] Date of Patent: Oct. 26, 1999

[54] PIPE LAYING VESSEL

[75] Inventors: Robert George Martin, Oldmeldrum; Donald Carmichael; Stephen John Roberts, both of Aberdeen, all of United Kingdom

[73] Assignee: Coflexip Stena Offshore Limited, United Kingdom

[21] Appl. No.: 08/704,693

[22] PCT Filed: Mar. 16, 1995

[86] PCT No.: PCT/GB95/00573

§ 371 Date: Nov. 26, 1996

§ 102(e) Date: Nov. 26, 1996

[87] PCT Pub. No.: WO95/25237

PCT Pub. Date: Sep. 21, 1995

[30] Foreign Application Priority Data

Mar. 16, 1994 [GB] United Kingdom .................. 9405067
Jun. 10, 1994 [GB] United Kingdom .................. 9411702

[51] Int. Cl.$^6$ ...................................................... F16L 1/12
[52] U.S. Cl. .................... 405/168.1; 405/158; 405/166; 405/169
[58] Field of Search .................. 405/166, 167, 405/168.1–168.4, 170

[56] References Cited

U.S. PATENT DOCUMENTS

| | | | |
|---|---|---|---|
| 3,681,927 | 8/1972 | Duc et al. | 405/166 |
| 3,685,305 | 8/1972 | Lloyd | 405/166 |
| 3,685,306 | 8/1972 | Mott | 405/168.3 |
| 3,822,559 | 7/1974 | Matthews et al. | 405/166 |
| 5,011,333 | 4/1991 | Lanan | 405/166 |

FOREIGN PATENT DOCUMENTS

| | | | |
|---|---|---|---|
| 667802 | 7/1963 | Canada | 405/167 |
| 2447852 | 8/1980 | France | 405/168.3 |
| 441135 | 1/1968 | Switzerland | 405/166 |
| 2095787 | 10/1982 | United Kingdom | 405/168.1 |
| 2217424 | 10/1989 | United Kingdom | 405/166 |

*Primary Examiner*—Dennis L. Taylor
*Attorney, Agent, or Firm*—Ostrolenk, Faber, Gerb & Soffen, LLP

[57] ABSTRACT

An apparatus for laying marine pipelines of the type in which the pipeline is assembled along a horizontal axis on board a pipelaying vessel prior to being launched therefrom; in which the pipeline is plastically bent to a desired launch angle and, in most cases, at least partially straightened thereafter. In preferred embodiments, the pipeline is bent through an angle greater than 90°. In the most preferred embodiments, the pipeline is diverted through an angle of substantially 270°, plus or minus an angle allowing variation in the launch angle from the vertical, and crosses itself prior to entering the water. The pipeline (102) is diverted by being passed around a wheel-like diverter structure (104), the pipeline being assembled in multiple fabrication lines to produce stalks which are aligned and connected in a central firing line prior to being fed around the diverter structure. Other variations are also described.

51 Claims, 8 Drawing Sheets

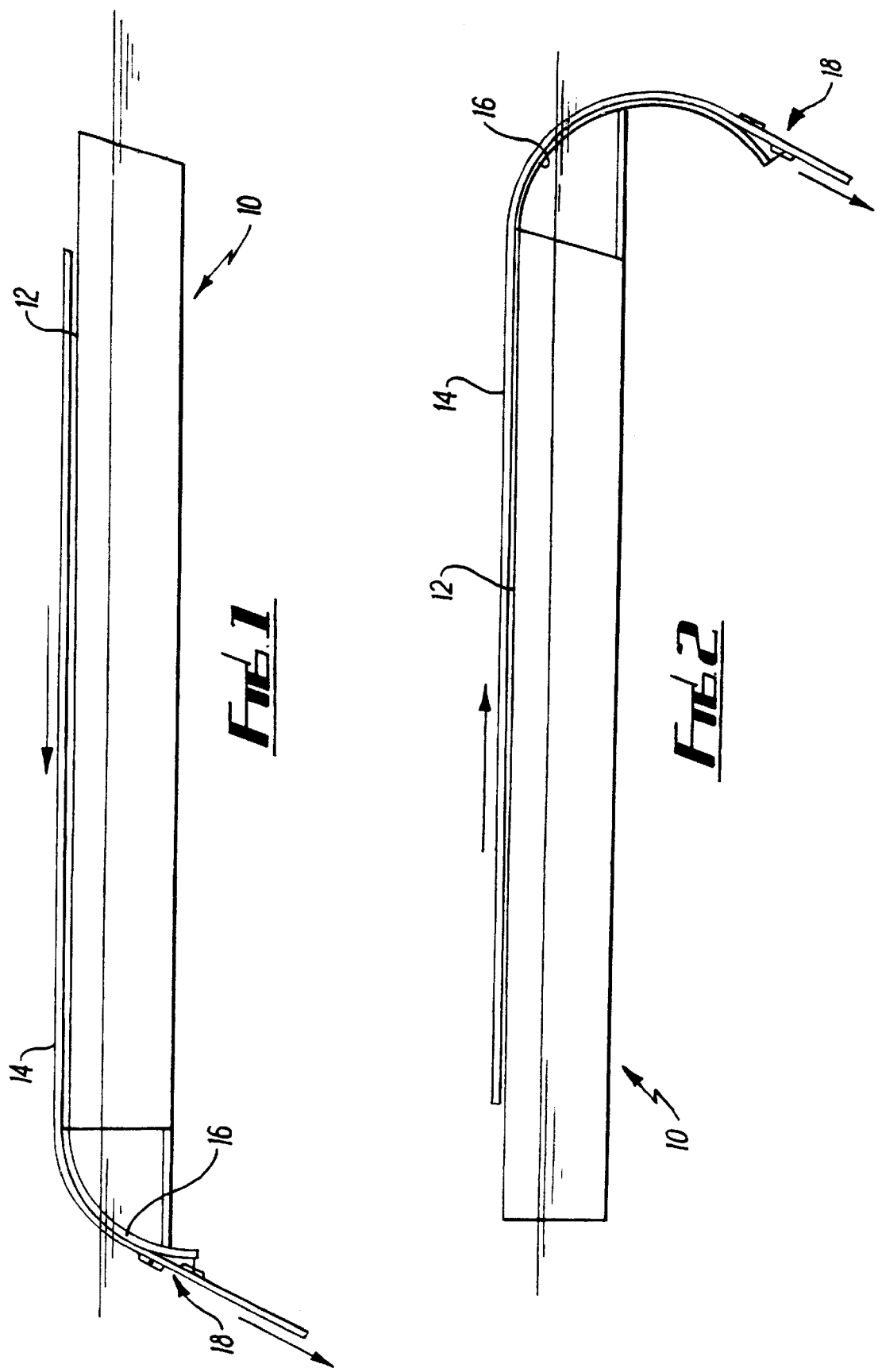

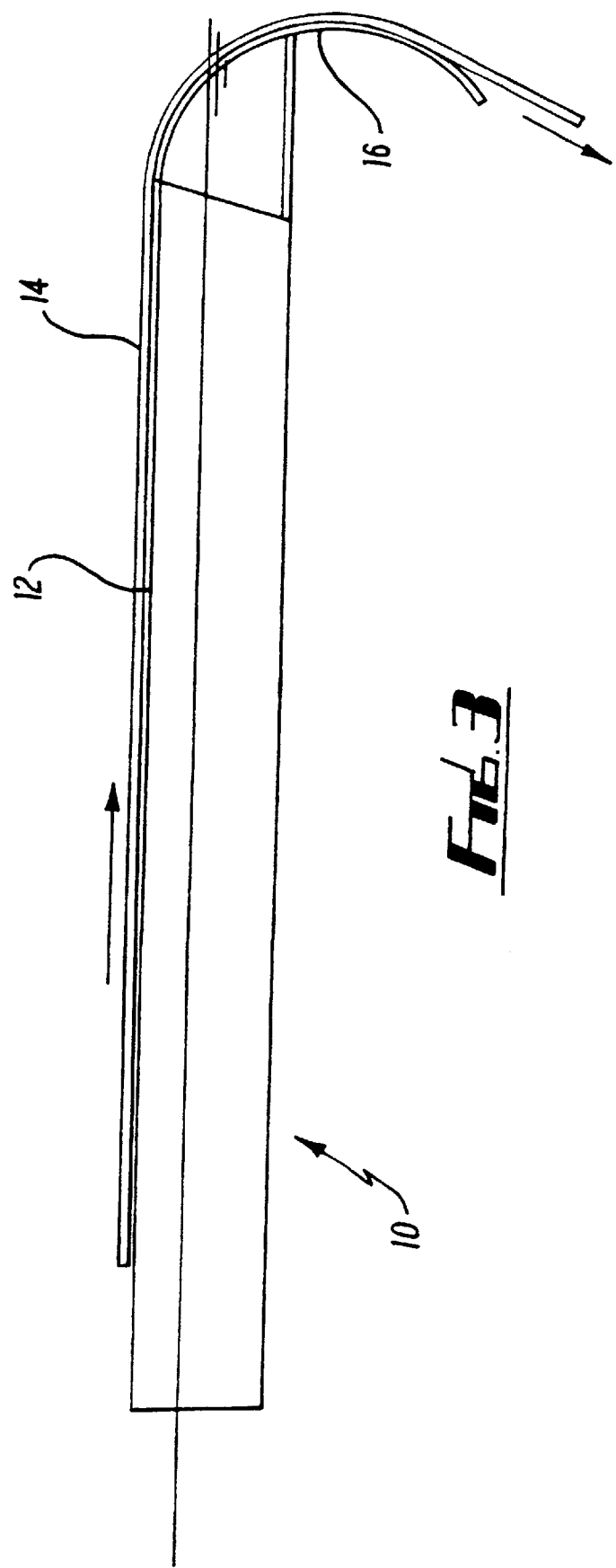

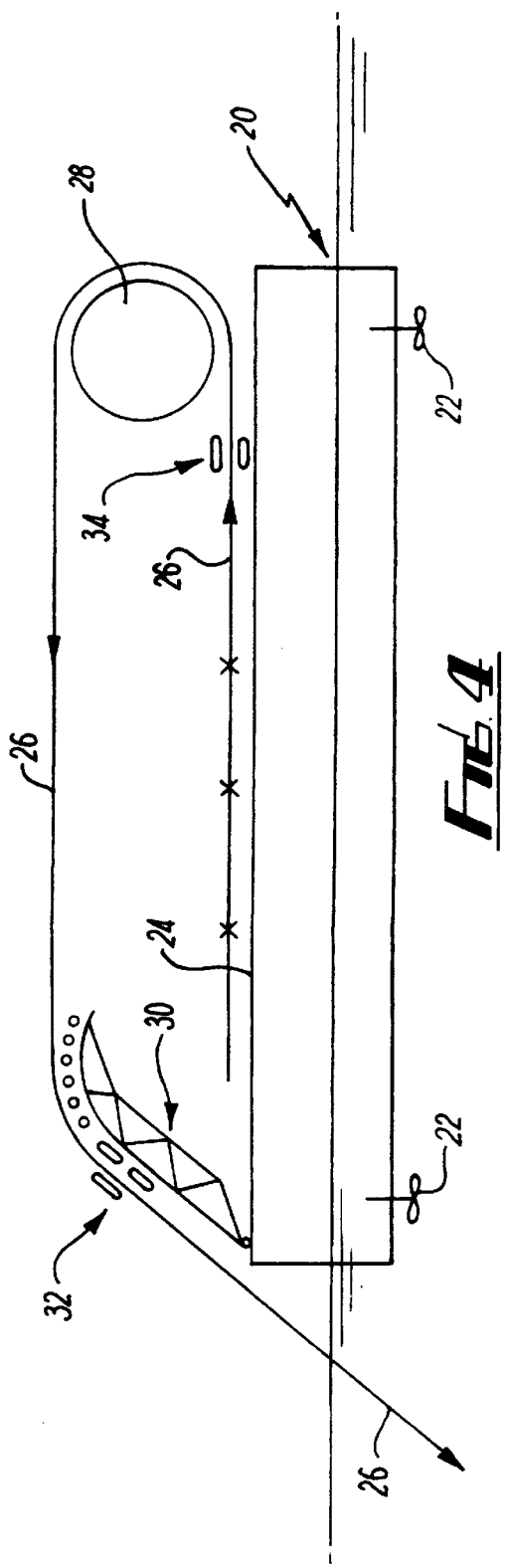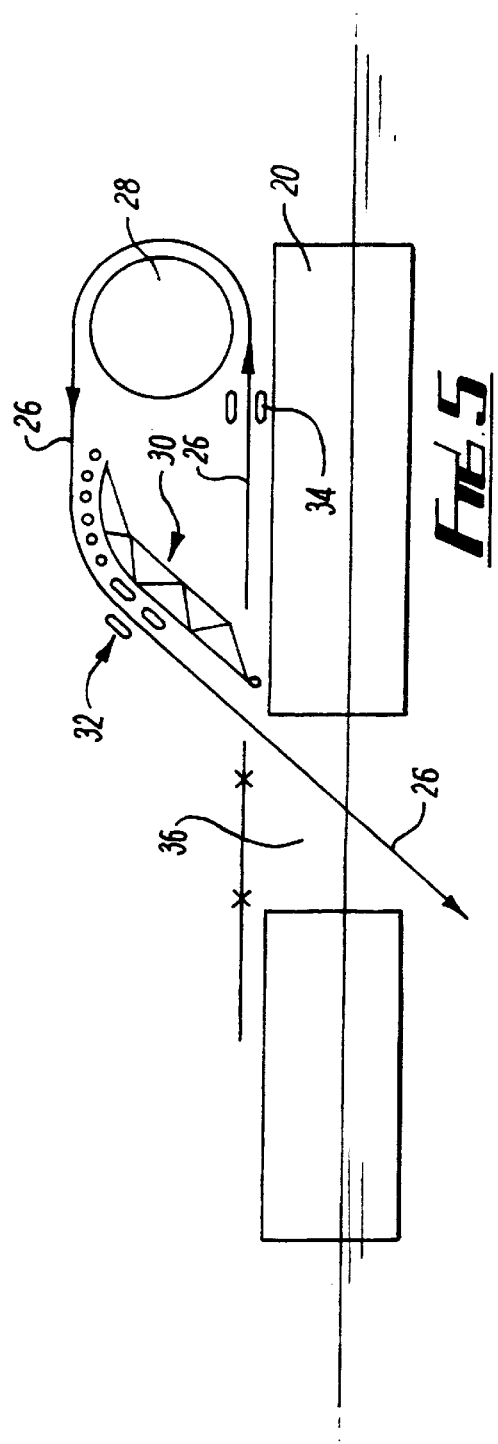

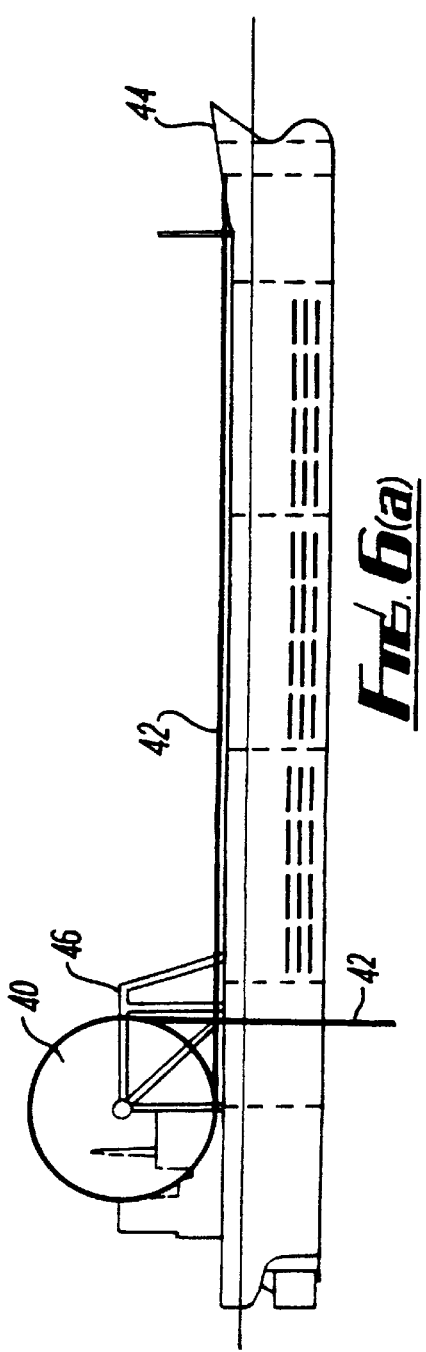
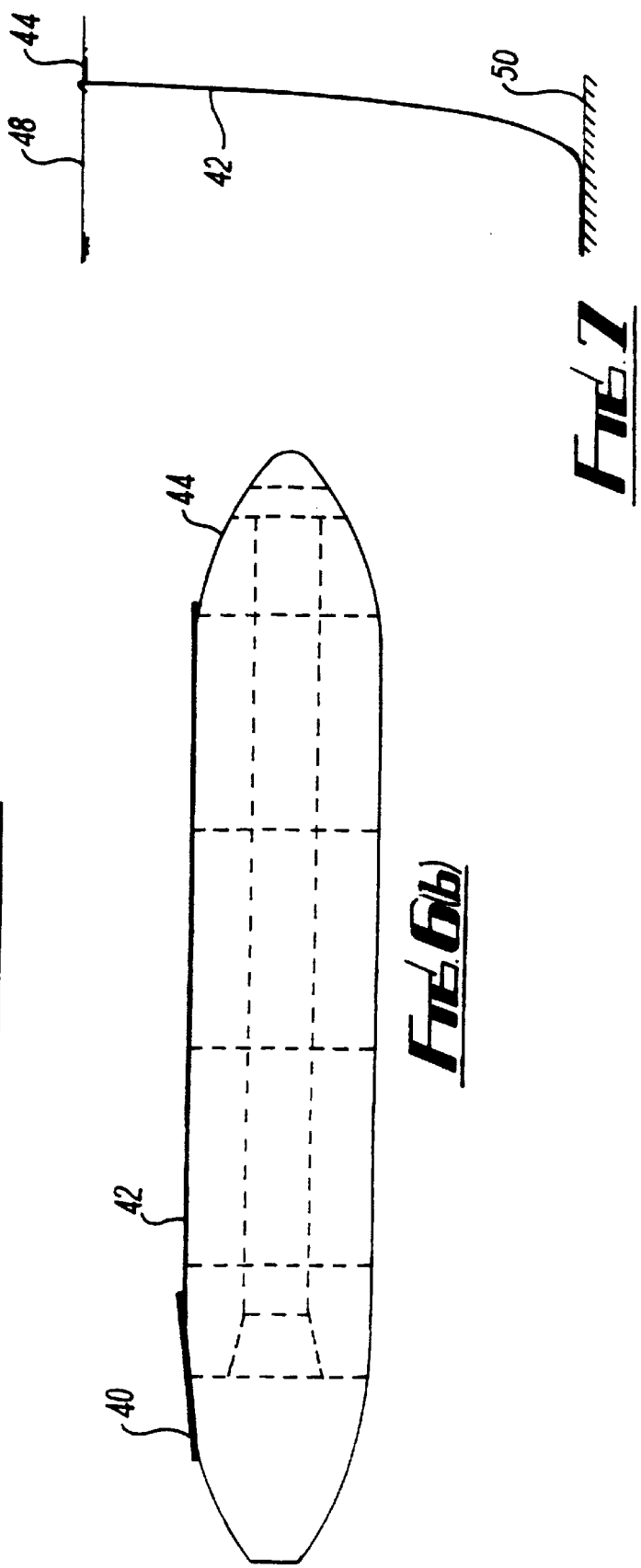

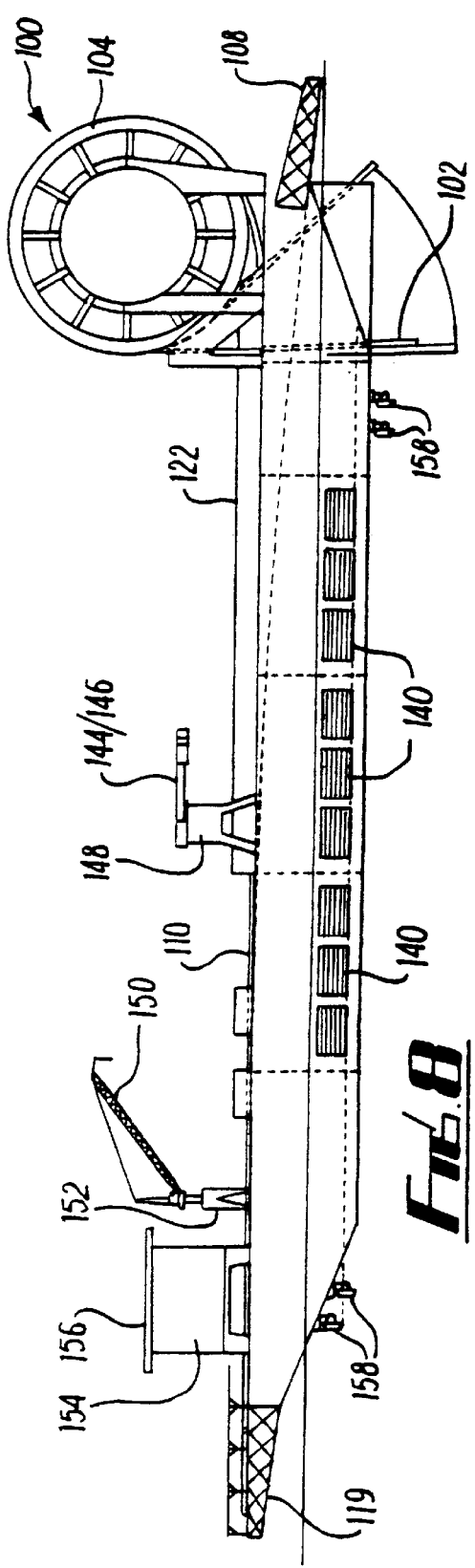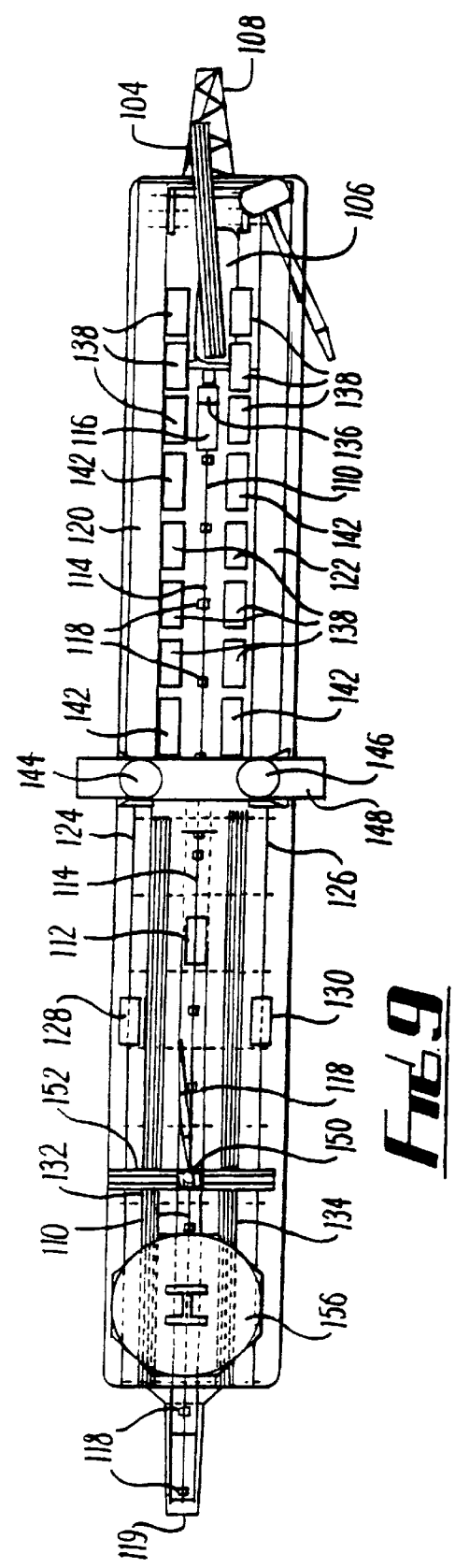

PIPE LAYING VESSEL

This invention relates to the laying of submarine pipelines.

Known methods of submarine pipelaying fall into two broad classes.

First, there are methods in which pipe lengths are shipped on a vessel such as a lay barge and are welded end to end as laying proceeds. These can be divided into "S lay" where the pipe is welded up in a horizontal path and laid over a stinger, and "J lay" where the pipe is launched from the vessel in a substantially vertical direction and each succeeding pipe length must be erected into a substantially vertical position for welding to the last section.

Each of these has problems and limitations. S lay requires a cumbersome and expensive stinger and can operate only in relatively shallow water. J lay can cope with deeper water, but handling pipe lengths into the vertical and welding them in that position is difficult and time consuming.

The second broad category of known method is reel pipelaying. This has the great benefit of allowing the bulk of the welding to be carried out in factory conditions ashore. However, a complex, specialised lay vessel is required for larger diameter pipelines. Reel pipelaying using existing arrangements is generally preferable on economic grounds for pipelines having an o.d. of 16" or less. However, this is not an absolute limit and may vary depending upon detailed operational requirements.

It should be noted that in the first of the foregoing categories, persons in the art have always considered it important to avoid plastic deformation of the pipe, seeking to control the double bends of S lay and the single bend of J lay such that the elastic limit of the pipe material is not exceeded. In reel pipelaying, the act of reeling solid pipe requires plastic deformation which is subsequently reversed by a straightener assembly.

An object of the present invention is to provide methods of, and vessels for, laying underwater pipelines which do not fall into the foregoing categories. The invention is particularly, but not exclusively, applicable to the laying of large diameter pipe which it is not practicable to coil on a reel and which must therefore be welded on the lay vessel.

In accordance with a first aspect of the invention, there is provided a method of laying an underwater pipeline, comprising assembling pipe sections together along a substantially horizontal axis on the deck of a vessel to form a pipeline and laying the pipeline onto the sea bed as pipeline assembly progresses, the pipeline being bent as it is laid from the vessel.

Preferably, the pipeline is plastically bent about a substantially arcuate path in a substantially vertical plane.

In preferred embodiments of the invention, the pipeline is bent through an angle greater than 90°.

Preferably also, the pipeline is launched at a substantial angle to the horizontal and tension is applied to the pipeline, said angle being selected to allow the pipeline to form a catenary curve between the launch point and the sea bed for a given applied tension. The tension is preferably also controlled to ensure that the bending of the pipeline at the point where it meets the sea bed is within the elastic yield limit of the pipe material.

Also in the preferred embodiments of the invention, bending of the pipeline is followed by straightening thereof.

In certain embodiments, the bending of the pipeline includes diverting the pipeline upwardly along a substantially arcuate path and subsequently diverting the pipeline downwardly and launching the pipeline via an adjustable-angle ramp. Preferably, said pipeline is straightened by straightening means mounted on said variable angle ramp after being diverted downwardly to its final launch angle. Preferably also, tension is applied to said pipeline by tensioning means prior to being diverted upwardly.

In certain particular embodiments, said upward bending of the pipeline diverts the pipeline about a horizontal axis through substantially 180° prior to being launched via said ramp. In these cases the pipeline is preferably bent about a circular sheave defining an arcuate pipeline bending path.

In these embodiments, the pipeline may be launched from the stern of the vessel or through a moon-pool.

In other preferred embodiments, the bending of the pipeline includes diverting the pipeline, initially upwardly, along a substantially arcuate path about a horizontal axis through an angle greater than 180° prior to launching the pipeline.

In these embodiments, the pipeline is preferably fed in a direction from the bow of the vessel towards the stern thereof and is diverted through an angle of substantially 270° or greater, and typically less than or equal to 310°. The pipeline might be diverted through one or more complete turns, in which case the pipeline is diverted through an angle greater than or equal to 270° plus an integer multiple of 360°, and typically less than or equal to 310° plus said integer multiple of 360°.

Alternatively, the pipeline may be fed in a direction from the stern of the vessel towards the bow thereof and is diverted through an angle of substantially 270° or less, and typically greater than or equal to 230°. Again, the pipeline might be diverted through one or more complete turns, in which case the pipeline is diverted through an angle less than or equal to 270° plus an integer multiple of 360°, and typically greater than or equal to 230° plus said integer multiple of 360°.

In these embodiments the pipeline may be launched from the side of the vessel, over the stern or the bow of the vessel, or via a moonpool.

The pipeline is preferably diverted by being passed around a pipeline supporting structure defining a substantially arcuate path. The launch angle of the pipeline may be varied by varying the point at which the pipeline departs from said substantially arcuate path, and the pipeline is preferably straightened by straightening means after departing from said substantially arcuate path.

The pipeline preferably passes through pipe guide means after being straightened, and the launch angle of the pipeline may be varied by translating said pipe guide means in a fore and aft direction.

Tension may be applied to said pipeline by tensioning means located upstream of said pipeline supporting structure in the direction of pipeline travel, or by tensioning means located downstream of said pipeline supporting structure in the direction of pipeline travel, or by a braking force applied to said pipeline as it passes around said substantially arcuate path, or by any combination of these.

Preferably also, the plane of said substantially arcuate path is disposed at an angle to the horizontal pipeline assembly axis, and said pipeline is diverted in a horizontal plane into alignment with the plane of said substantially arcuate path prior to engaging said substantially arcuate path. Most preferably, this horizontal diversion is effected prior to said pipeline being diverted upwardly to engage said substantially arcuate path. Any plastic bending of said pipeline induced by said horizontal diversion may be straightened by means of tension applied to said pipeline as it passes around said substantially arcuate path.

In preferred embodiments of the invention, individual pipe joints are assembled into a plurality of pipe stalks simultaneously in a plurality of parallel stalk fabrication lines. The assembled pipe stalks are then transported in the fore and aft direction of said vessel to a corresponding plurality of repair lines extending substantially colinearly with said fabrication lines. The pipe stalks may then be transported transversely from said repair lines to a corresponding plurality of stalk storage areas adjacent to and substantially parallel with said horizontal pipeline assembly axis, and pipe stalks may then be transported from said stalk storage areas and aligned end to end along said horizontal pipeline assembly axis.

This arrangement allows adjacent ends of said stalks are connected together and the end of a first one of said stalks is connected to the free end of the pipeline downstream from said substantially arcuate path in the direction of pipeline travel, substantially simultaneously. Connection of said ends of said stalks may be followed by non-destructive testing and field-coating of the connections therebetween.

In a further embodiment, the pipeline is fed in a direction from the stern of said vessel towards the bow thereof and is diverted downwardly through an angle greater than or equal to 90° as it is launched over said bow. In this case the pipeline is diverted by being passed around a pipeline supporting structure defining a substantially arcuate path, the launch angle of the pipeline may be varied by varying the point at which the pipeline departs from said substantially arcuate path, and the pipeline may be straightened by straightening means after departing from said substantially arcuate path.

In accordance with a second aspect of the invention, there is provided a vessel for use in laying an underwater pipeline, the vessel including a deck area, means on the deck area for aligning pipe sections along a substantially horizontal axis and connecting said pipe sections together to form a pipeline, and means for bending the pipeline to cause it to pass from said horizontal axis to a launch axis having a substantial inclination to the horizontal.

Preferably, said pipeline bending means is adapted to plastically bend the pipeline about a substantially arcuate path in a substantially vertical plane.

In preferred embodiments, said pipeline bending means is adapted to bend the pipeline through an angle greater than 90°.

The vessel preferably further includes means for applying tension to said pipeline, and means for controlling said tension to ensure that the bending of the pipeline at the point where it meets the sea bed is within the elastic yield limit of the pipe material.

Straightening means are preferably also provided downstream of said bending means for removing the bend in the pipeline.

In certain embodiments said bending means is adapted to bend said pipeline upwardly along a substantially arcuate path and subsequently to bend said pipeline downwardly to a final launch angle.

In particular embodiments, said bending means comprises first bending means for diverting the pipeline upwardly along said substantially arcuate path and second bending means for subsequently diverting the pipeline downwardly to said final launch angle. Said second bending means preferably comprises an adjustable-angle ramp, which is preferably located for launching the pipeline from the stern of the vessel, or through a moon-pool.

Preferably also, said straightening means is mounted on said variable angle ramp for straightening said pipeline after it has been diverted downwardly to its final launch angle, and tensioning means is provided located upstream of said first bending means in the direction of pipeline travel.

Most preferably, said first bending means is adapted to divert the pipeline about a horizontal axis through substantially 180° prior to being launched via said ramp, and said first bending means comprises a sheave mounted above the deck area.

In other preferred embodiments, means are provided for feeding the pipeline in a direction from the bow of the vessel towards the stern thereof and said pipeline bending means is adapted to divert said pipeline through an angle of substantially 270° or greater, and typically less than or equal to 310°.

The pipeline may be diverted through one or more complete turns, in which case the pipeline bending means is adapted to divert said pipeline through an angle greater than or equal to 270° plus an integer multiple of 360°, and typically less than or equal to 310° plus said integer multiple of 360°.

Alternatively, the vessel may include means for feeding the pipeline in a direction from the stern of the vessel towards the bow thereof and said pipeline bending means is adapted to diverted said pipeline through an angle of substantially 270° or less, and typically greater than or equal to 230°.

Again, the pipeline may be diverted through one or more complete turns, in which case said pipeline bending means is adapted to divert said pipeline through an angle less than or equal to 270° plus an integer multiple of 360°, and typically greater than or equal to 230° plus said integer multiple of 360°.

In these embodiments, the pipeline may be launched from the side of the vessel over the stern or the bow of the vessel, or via a moon-pool.

Preferably, the pipeline is diverted by being passed around a pipeline supporting structure defining a substantially arcuate path. Most preferably, said pipeline supporting structure comprises a substantially circular wheel, said substantially arcuate path extending around the outer rim of said wheel. In one embodiment, said pipeline path comprises a roller type conveyor or endless belt type conveyor.

The vessel preferably also includes means for varying the launch angle of the pipeline by varying the point at which the pipeline departs from said substantially arcuate path, straightening means for straightening said pipeline after it departs from said substantially arcuate path, and pipe guide means through which said pipeline passes after being straightened. Preferably, said pipe guide means is adapted to be translated in a fore and aft direction so as to vary the launch angle of the pipeline.

The vessel preferably also includes tensioning means for applying tension to the pipeline, located upstream of said pipeline supporting structure in the direction of pipeline travel, and/or tensioning means for applying tension to the pipeline, located downstream of said pipeline supporting structure in the direction of pipeline travel, and/or means for applying a braking force to said pipeline as it passes around said substantially arcuate path.

The plane of said substantially arcuate path is preferably disposed at an angle to the horizontal pipeline assembly axis, and the vessel includes alignment means for diverting the pipeline in a horizontal plane into alignment with the plane of said substantially arcuate path prior to the pipeline engaging said substantially arcuate path. Most preferably, said alignment means is adapted to effect said horizontal diversion prior to said pipeline being diverted upwardly to engage said substantially arcuate path.

Preferred embodiments of the vessel also include:

a plurality of parallel stalk fabrication lines in which individual pipe joints may be assembled simultaneously into a plurality of pipe stalks;

a corresponding plurality of repair lines disposed substantially colinearly with said fabrication lines, and means for transporting assembled pipe stalks in the fore and aft direction of said vessel from said fabrication lines to said repair lines;

a plurality of stalk storage areas disposed adjacent to and substantially parallel with said horizontal pipeline assembly axis and means for transporting assembled pipe stalks are transported transversely from said repair lines to said stalk storage areas;

means for transporting pipe stalks from said stalk storage areas and for aligning said stalks end to end along said horizontal pipeline assembly axis; and a plurality of work stations for connecting adjacent ends of said stalks and for connecting a first one of said stalks to the free end of the pipeline downstream from said substantially arcuate path in the direction of pipeline travel, substantially simultaneously. Said work stations may include means for performing non-destructive testing and field-coating of the connections therebetween.

In an alternative embodiment, the vessel may include means for feeding the pipeline in a direction from the stern of said vessel towards the bow thereof and means for diverting the pipeline downwardly through an angle greater than or equal to 90° as it is launched over said bow. Said means for diverting said pipeline may comprise a pipeline supporting structure defining a substantially arcuate path, projecting over the bow of the vessel. The vessel preferably also includes means for varying the point at which the pipeline departs from said substantially arcuate path so as to vary the launch angle of the pipeline; and straightening means for straightening said pipeline after it departs from said substantially arcuate path.

Embodiments of the present invention will now be described, by way of example only, with reference to the accompanying drawings, in which:

FIG. 1 is a schematic side view of a vessel forming one embodiment of the invention;

FIGS. 2–5 are similar views each illustrating a further embodiment;

Figure 10:
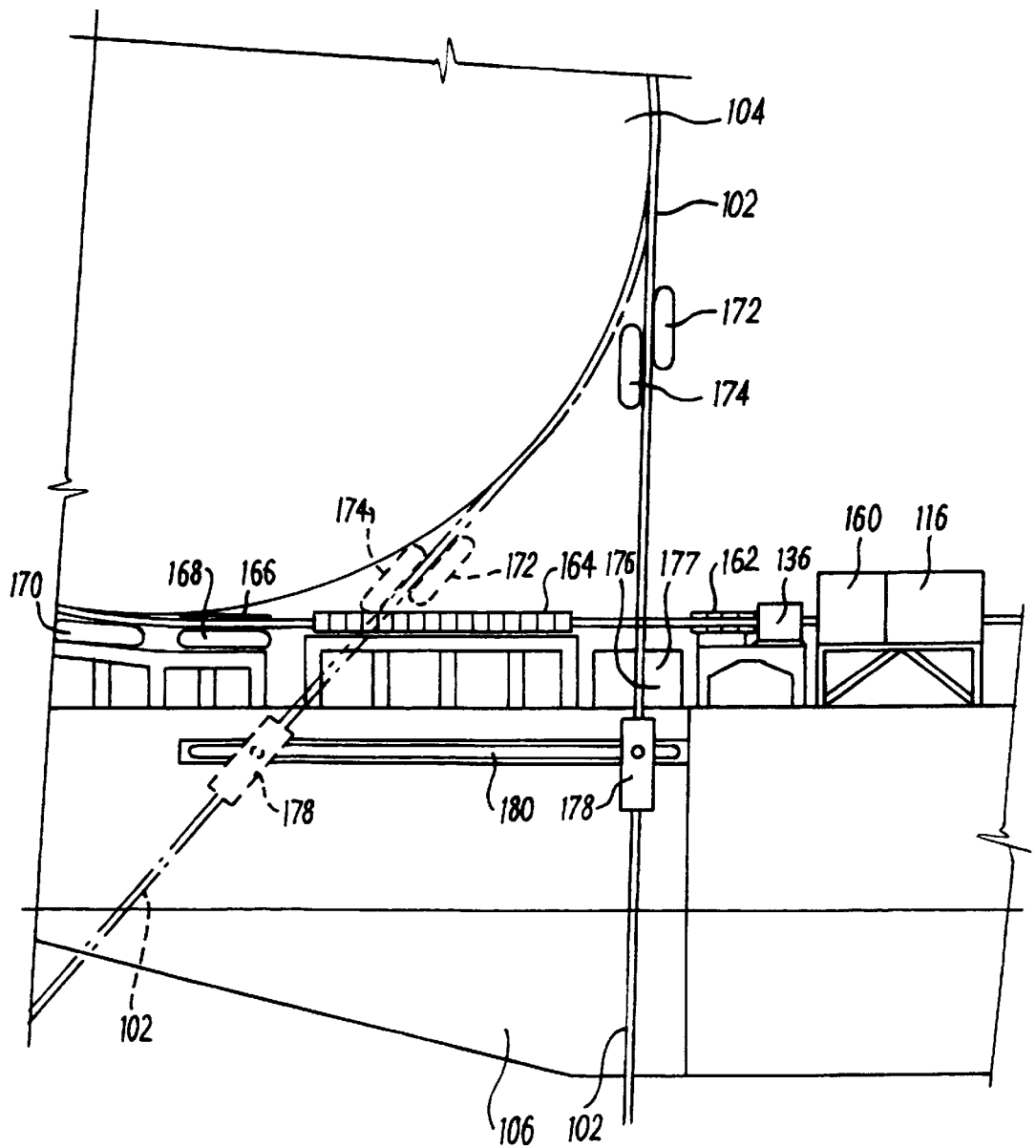
Figure 11:
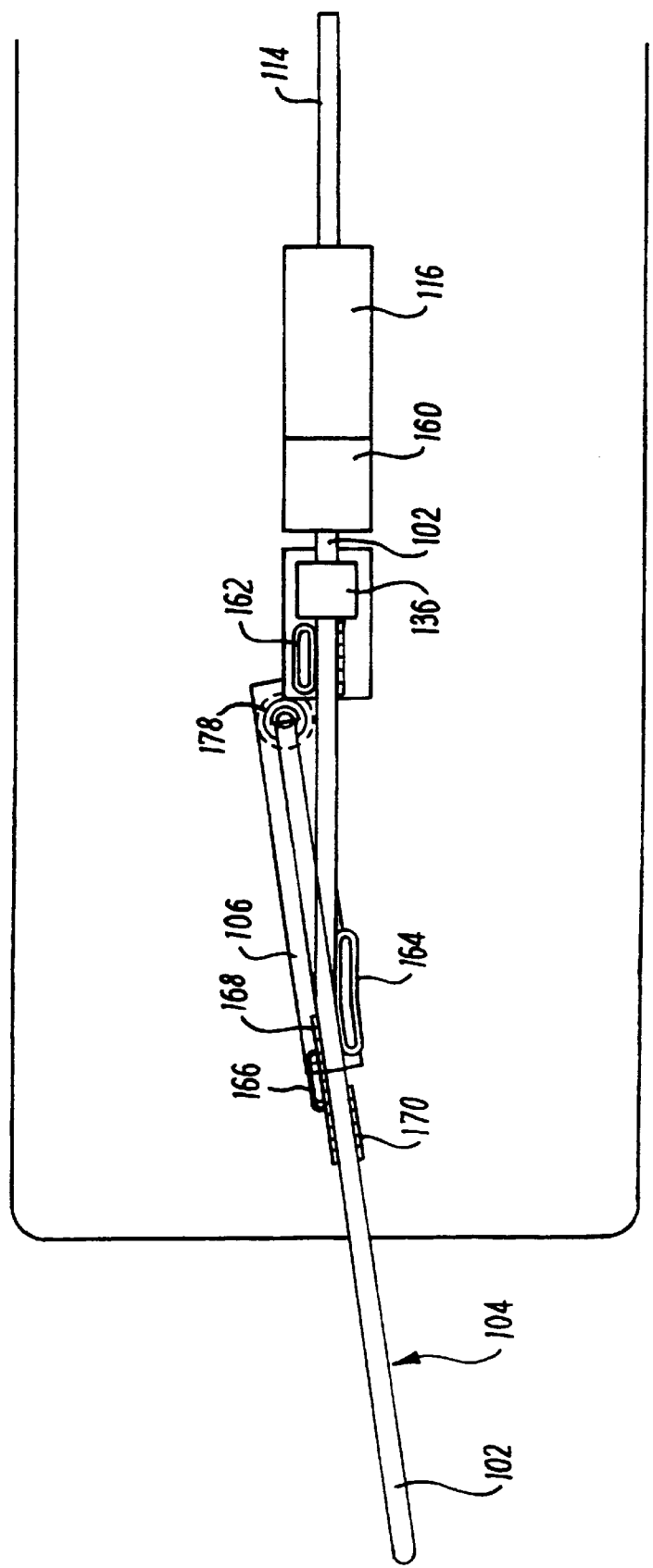

FIGS. 6(a) and 6(b) are, respectively, schematic side and plan views illustrating still another embodiment;

FIG. 7 is a schematic side view illustrating the pipeline catenary between the vessel and the seabed for the embodiment of FIGS. 6(a) and 6(b);

FIG. 8 is a schematic side view of a more detailed embodiment similar to that of FIGS. 6 and 7;

FIG. 9 is a plan view of the embodiment of FIG. 8;

FIG. 10 is an enlarged, partial side view of the pipeline diverting and launching mechanism of the embodiment of FIG. 8;

FIG. 11 is a plan view of the mechanism of FIG. 10; and

Figure 12:
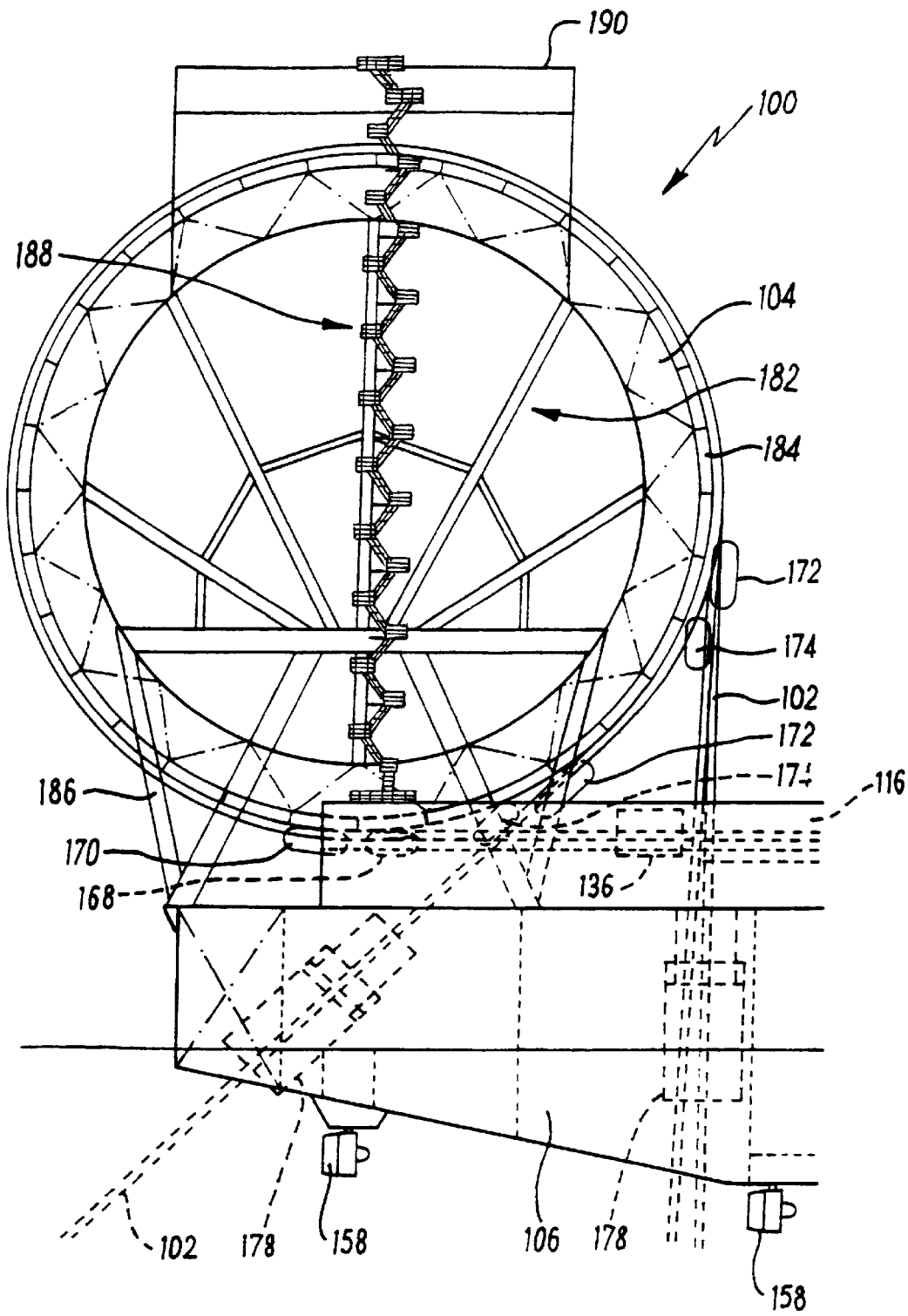

FIG. 12 is a schematic side view of one example of the mechanism of FIGS. 10 and 11.

Referring to FIG. 1, a vessel 10 has a deck area 12 on which pipe sections are assembled and welded together along a horizontal assembly axis by methods well known per se to form a pipeline 14. The pipeline 14 is paid out to the sea bed at the stern of the vessel 10 by being passed over an aligner ramp 16 which is a relatively short, substantially arcuate structure. This avoids the need for a long stinger and allows the pipeline 14 to be aligned to an acute angle suitable for laying into deep water, while at the same time causing plastic yielding of the pipe.

A straightener assembly 18 is provided at the downstream end of the aligner ramp 16 for imparting reverse bending forces to the pipeline and thus removing the bend imparted by passage over the aligner ramp 16. Suitable forms of straightener are discussed in greater detail below. The straightener assembly 18 may also act as a tensioner for controlling the tension applied to the catenary section of the pipeline between the vessel 10 and the seabed.

The embodiment of FIG. 2 is similar to that of FIG. 1, but the pipe 14 is assembled in the forward direction of the ship and is launched over the bow. This involves a substantial projection at the bow, but has the advantage that existing vessels with aft superstructure can be utilised with a minimum of modification. Redundant oil tankers are an example of suitable aft-superstructure ships, having large deck areas and being capable of carrying large quantities of pipe. It should be noted that, although not shown in FIG. 2, such vessels normally have a bulbous bow form which provides a useful support structure for the aligner ramp 16 and straightener assembly 18.

FIG. 3 shows a vessel which is similar to that of FIG. 2 with the straightener assembly 18 omitted. It is contemplated that it would normally be desirable for the pipeline 14 to be straightened after being bent over the aligner ramp 16. However, the use of over-bow launching makes it possible to consider the omission of the straightening step. This is because the curvature imparted to the pipeline 14 is such that the pipe when laid will tend to bend down into the sea bed rather than upwardly away from it, which may indeed be useful in urging the pipe into contact with hollows in the sea bed.

Turning to FIG. 4, a self-propelled lay barge 20, propelled and positioned by vectoring thrusters indicated at 22, has a deck area 24 on which pipe sections are welded along a horizontal axis to form a pipeline 26. The direction of the pipeline 26 is then reversed by bending it around a sheave 28, and the pipeline 26 is then launched from the vessel over a ramp assembly 30 which includes a straightener 32. A tensioner 34 is provided at a point immediately before the pipeline 26 passes from the deck area 24 to the sheave 28, to control both the bending of the pipe around the sheave and the laying tension.

The ramp assembly 30 is pivotally mounted to the deck of the vessel 20 and is provided with elevating means (not shown) for adjusting its vertical angle to suit the depth of water in which the pipeline 26 is being laid.

The ramp assembly 30 is similar to that used in the reel pipelay vessel "Apache" as described for example in U.S. Pat. Nos. 4,230,421, 4,269,540, 4,297,054, 4,340,322 and 4,345,855.

The straightener 32 (and the straightener assembly 18 of FIGS. 1 and 2) comprises a three-point straightener, preferably a roller assembly of a type which is known in the art. Three-point straightening of pipelines is discussed in U.S. Pat. Nos. 3,237,438 and 3,372,461. Examples of roller-type straighteners of the generally preferred type, and their operation, are described in the above referenced U.S. Pat. Nos. 3,855,835, 4,157,023, 4,243,345 and 4,260,287. Alternative "roller-track" type assemblies are also described in above referenced U.S. Pat. Nos. 4,230,421, 4,269,540, 4,297,054, 4,340,322 and 4,345,855, and further in U.S. Pat. Nos. 3,641,778, 3,680,342, Re 30,846 and 4,723,874. In the case of the straightener assembly 18 of FIGS. 1 and 2 the aligner 16 acts as one of the three reaction points required for pipeline straightening. In each case the roller-tracks are arranged on opposite sides of the pipe, and means are provided for positioning the tracks to impart a reverse bending force.

The tensioner 34 may suitably comprise two similar tracks engaging the pipe and means, such as hydraulic motors, for causing the tracks to apply a braking force to the pipe.

The sheave 28 may be constructed and supported in a manner similar to the reel of a reel ship, but can be of relatively light weight construction since it does not have to carry the static load of a cargo of pipe.

FIG. 5 shows a modified form of the vessel 20 of FIG. 4. The pipeline 28 is launched from the vessel through a moonpool 36, rather than over the stern. This makes it possible to have the launch point adjacent the centre of the vessel, and thus to minimise the effects of vessel motion on the laying operation.

FIGS. 6(a) and 6(b) show still another embodiment of the invention. This embodiment is particularly suited to deepwater operations, and includes a sheave, wheel or equivalent structure 40 for diverting the pipeline 42 through substantially 270° or more from the horizontal so as to enter the water substantially vertically or at some required angle. The wheel 40 might have a diameter of approximately 50 meters and is rotatably mounted adjacent one side of the vessel 44 on a support structure 46.

The structure 46 may also support straightening means (not shown, suitably of any of the types previously discussed) for straightening the pipeline 42 as it leaves the wheel 40, and abandonment and recovery (A & R) equipment (ie pipeline clamps and winches and the like), as is well known in the art. For very high pipeline tensions, A & R operations may involve the use of a drill string (rather than a cable), which may be deployed from a short derrick disposed above the pipeline departure point.

Since the pipeline leaving the wheel 40 must cross the horizontal path of the pipeline being fed onto the wheel, the plane of the wheel 40 is set at a slight angle to the horizontal pipeline path and the horizontal pipeline path is curved slightly as it approaches the wheel rim, as is best seen in FIG. 6(b). This diversion of the pipeline path to allow the pipe to cross itself is advantageously carried out at the entry of the pipe to the wheel rather than after its departure therefrom, since the required curvature of the pipe can be controlled using a horizontal track on the deck of the vessel, and the lower pipeline tension before feeding around the wheel allows tighter curvature.

This embodiment is suited to the application of high pipeline tensions, required for deepwater laying, without resort to expensive track-type tensioners, by means of: first and second fixed pipeline clamps (not shown) before and after the wheel 40 on the horizontal and vertical pipeline paths respectively; a horizontal moving clamp (not shown) located before the first fixed clamp, for lowering the pipeline joint by joint; and by driving the wheel. With a correctly profiled wheel rim, the wheel can be made to transmit the full lay tension required. However, in practice a degree of back tension would always be maintained. Possible alternative strategies for applying the required tension will be discussed further below.

FIG. 7 illustrates a typical profile of the catenary curve of a pipeline extending between the vessel 44 at the surface 48 and the seabed 50. This embodiment is also suited to the use of an adapted tanker as the lay vessel, having a very large clear deck area for the assembly of pipe stalks and large capacity for the storage of pipe joints below decks.

The wheel 40 might be replaced by other means defining the required arcuate pipeline path, such as a static structure having rollers or an endless belt conveyor for supporting the pipeline as it is diverted through the required angle. This also applies to the sheave 28 of FIGS. 4 and 5.

FIGS. 8 to 12 illustrate a further developed embodiment of a pipelay vessel incorporating a pipelay system similar in general concept to that of FIGS. 6 and 7. This embodiment is particularly intended to be implemented as a purpose built vessel. However, aspects thereof could be implemented by conversion of an existing vessel.

The vessel of FIGS. 8 to 12 includes a pipeline diverter structure generally designated by the reference numeral 100, mounted at the stern of the vessel. The structure 100 is adapted to divert the pipeline 102 about an arcuate path through an adjustable angle of substantially 270° or more, as in the embodiment of FIG. 6. This provides a pipeline launch angle which is variable up to 90°. The arcuate pipeline path is defined by a curved structure 104 (circular in this example), which shall be referred to herein, for convenience, as a "wheel".

In this example, the wheel 104 comprises a pipeline supporting conveyor extending around the peripheral rim of a static circular structure. The pipeline conveyor may comprise a series of idle rollers having their axes of rotation extending at right angles to the direction of pipeline travel. Alternatively, the conveyor might comprise a continuous, endless belt or chain type conveyor encircling the supporting structure. An endless belt conveyor of this type may be driven or may be idle. Pipeline conveyors of these types are known in the art, as used in the pipe bearing portions of straighteners, tensioners, aligners and stingers, and the like, and shall not be described in greater detail herein. It will be appreciated, that the invention could also be implemented with a wheel which rotates about a central axis, as discussed above in relation to FIG. 6.

Also, the wheel 104 might alternatively be mounted at the bow of the vessel, in which case the angle through which the pipeline is diverted would be less than 270° for launch angles less than 90°; ie the adjustability of the exit angle of the pipeline 102 from the wheel 104 would be in the opposite direction from that illustrated in the present example.

In the case where the pipeline supporting surface of the wheel comprises a roller type conveyor, the rollers of the conveyor, and hence the "wheel" itself, would be freely rotatable (ie "idling" or "freewheeling") and the path of the roller type conveyor need extend around the periphery of the circular supporting structure only through substantially 270° plus an additional angle to accommodate any desired variability of the pipeline launch angle, rather than through the full 360° of the circular structure. In the case where the pipeline supporting structure comprises an endless belt conveyor or the rim of a rotatable wheel, the belt conveyor or wheel may either be driven (for example, by one or more drive sprockets, not shown) or freely rotatable, depending upon the pipeline tensioning arrangements which are to be employed (as shall be discussed further below). In the case of the roller or endless belt conveyor, it will be understood that the pipeline path need not be circular, and may have a varying curvature. For example, the radius of curvature of the pipeline path might increase between the pipeline inlet end and the pipeline outlet end of the pipeline path. The term "wheel" is used for convenience in the present discussion, but will be understood to embrace these possible variations of curved pipeline diverter structures.

It will be noted that in the embodiments of FIGS. 4, 5, 6 and 8 to 12, the diversion of the pipeline between the horizontal and the final launch angle is always in the same direction, although the degree of curvature may vary along the pipeline path.

Where the pipeline supporting surface is provided by the rim of a rotatable wheel, it may be desirable for the supporting surface to comprise a plurality of discrete pipe supporting elements arranged around the circumference of the rim, and adapted to be slightly movable in the circumferential direction. Such an arrangement would accommodate variations in the length of the pipeline as it passes around the wheel, preventing relative movement between the pipeline and its supporting surface.

As in FIG. 6, the pipeline 102 is assembled on the deck of the vessel, as shall be described in greater detail below, passes around the wheel 104 and crosses itself prior to launch. As seen in FIG. 9, the plane of the wheel 104 is disposed at a slight angle to the vertical plane including the centreline of the vessel to allow the pipe to cross itself, as discussed above in relation to FIG. 6. In this example the pipeline is launched through a moonpool 106 adjacent the stern of the vessel, rather than from the side of the vessel as in FIG. 6. Alternatively, the moonpool 106 might be extended to the stern of the vessel so that the pipeline is effectively launched through a slot formed in the stern. As indicated above, similar arrangements might be employed with the pipeline diverter structure located at the bow of the vessel.

The wheel 104 might be approximately 60 meters in diameter, the overall vessel length being approximately 300 meters with a beam of approximately 42 meters. A 60 meter diameter wheel allows the laying of rigid steel pipe up to about 30 inches (762 mm) outside diameter. In this example, the rearward rim of the wheel 104 is cantilevered over the stern of the vessel, allowing the pipelaying mechanism also to be used as a heavy lift mechanism. The vessel may also be equipped with a conventional pipelay stinger 108 extending from the stern, allowing conventional "S-lay" pipelaying independent of the wheel 104. This would be suitable for operations in shallow waters.

The pipeline 102 to be laid by the vessel is assembled from individual "joints" of pipe to form "stalks", typically 12 joints in length. The stalks are welded together prior to being passed around the wheel 104. The deck space of the vessel is utilised to ensure that the pipe stalks are assembled and tie-in welds connecting the stalks together are completed at a rate which does not impede the pipelaying operation of the vessel.

The length of the vessel is sufficient to accommodate two assembled stalks laid end to end. As seen in FIG. 9, a first assembled stalk 110 extends along the centreline of the vessel from the bow of the vessel to a first weld station 112. A second assembled stalk 114 extends along the centreline of the vessel from the first weld station 112 to a second weld station 116, adjacent the wheel 104. The stalks 110, 114 are supported and aligned by a plurality of adjustable shoes 118 disposed along the length of the deck. The forward end of the first pipe stalk 110 is supported by an extension 119 of the deck projecting forwards from the bow of the vessel.

The stalks are fabricated from individual pipe joints in first and second stalk fabrication lines 120, 122 extending along either side of the sternward half of the vessel parallel to the second stalk 116. Assembled stalks are transported forward to first and second repair lines 124, 126, extending along either side of the forward half of the vessel, parallel to the first pipe stalk 110, where faults are identified and made good by mobile repair stations 128, 130 adapted to travel backwards and forwards along the lengths of the repair lines 124, 126. From the repair lines 124, 126, the stalks are moved inwardly to first and second storage areas 132, 134 between the repair lines 124, 126 and the first stalk 110, where a plurality of assembled stalks may be stored prior to being transported to the main, central "firing line" when required.

In operation of the vessel, a supply of stalks would be fabricated and stored in areas 132, 134 prior to commencement of pipelaying. Pipelaying would commence by an initial stalk being loaded into the forward section of the firing line (the position occupied by the first stalk 110 in the FIG. 9), transported sternwards to the position occupied by the second stalk 114 and then pulled around the wheel 104 by an initiation cable (as is well known in the art), until its forward end reaches the second weld station 116.

This initial stalk is then clamped by means of a clamping mechanism 136 disposed between the second weld station 116 and the wheel 104.

The next stalk would then be loaded into the forward section of the firing line and moved sternwards until its leading end reaches the second weld station 116 and its trailing end is aligned with the first weld station 112. A further stalk is then loaded into the forward section of the firing line with its leading end at the first weld station. Tie-in welds can then be made simultaneously between the initial stalk and the next stalk at the second weld station 116 and between the next stalk and the further stalk at the first weld station 112. Non-destructive testing (NDT) and field-coating of the tie-in welds are also carried out at the weld stations 112, 116. Once welding, testing and coating are complete, the initial stalk can be unclamped and the assembled pipeline fed around the wheel 104. As soon as the pipeline clears the forward section of firing line, another stalk can be loaded and transported forward behind the welded pipeline, whereafter a further stalk may be loaded into the forward section of the firing line.

Once the trailing end of the welded pipeline reaches the second weld station, the pipeline is clamped as before and welding of the next two stalks may commence. Simultaneously, new stalks are being assembled in the fabrication lines 120, 122 and tested/repaired in the repair lines 124, 126, to replace those which have been loaded from storage into the firing line. This process is repeated in cyclical fashion throughout the pipelaying operation.

Stocks of pipe joints for the fabrication lines 120, 122 are stored in racks 138 between the firing line and the fabrication lines 120, 122. Additional stocks 140 are held below deck, accessed by hatches 142. In practice, the vessel would be continuously supplied with pipe by support vessels so that the pipe required for fabrication would normally always be supplied from the deck racks 138, the below-deck stocks 140 being held in reserve in case of interruptions in supply. First and second cranes 144, 146 are mounted on a first travelling gantry 148, which straddles the fabrication lines 120, 122, for loading pipe onto the vessel from port and starboard. A further utility crane 150 is mounted on a second travelling gantry 152 which straddles the repair lines 124, 126. An accommodation block 154 for personnel also straddles the repair lines 124, 126 at the bow of the vessel, and supports a helicopter landing deck 156.

The vessel is propelled and dynamically positioned by variable azimuth thrusters 158.

The pipeline diverting mechanism will now be described in greater detail, with reference to FIGS. 10 to 12 of the drawings.

FIGS. 10 and 11 show one example of pipeline diverting apparatus including clamping, aligning and straightening apparatus associated with the diverter wheel 104 of FIGS. 8 and 9, and an arrangement for varying the launch angle of the pipeline. As seen in the drawings, the pipeline 102 emerges from the second weld station 116, incorporating NDT/coating station 160, and passes through the clamp 136. The pipeline 102 must thereafter be bent in a horizontal plane for alignment with the rim of the wheel 104, which is set at an angle to the vessel centreline as previously described, before being deflected upwardly in a vertical plane to engage the rim of the wheel.

The horizontal alignment apparatus comprises first, second and third roller track assemblies 162, 164, 166 of a type generally known from existing pipeline straightening and tensioning apparatus. The first, forward section aligner 162 is positioned immediately aft of the clamp 136 on the same side of the pipeline 102 as the forward edge of the wheel 104. The second, mid-section aligner 164 is located aft of the first aligner 162 on the opposite side of the pipeline 102 from the first aligner 162. The pipe-engaging surface of the second aligner 164 is profiled to define the curvature required to bend the pipeline 102 into alignment with the wheel rim. The third, aft section aligner 166 is located aft of the second aligner 164 on the same side of the pipeline as the first aligner 162. The second aligner 164 is relatively longer than the first and third aligners 162, 166, which provide reaction points for the pipeline to be bent to the curvature of the second aligner 164. It is desirable for the horizontal alignment of the pipeline 102 to be performed prior to any vertical deflection thereof.

The vertical deflection apparatus comprises first and second roller track assemblies 168, 170 located below the pipeline 102. The first deflector 168 is substantially horizontal and may be positioned adjacent the third aligner 166. The second deflector 170 is inclined slightly upwards in the direction of pipeline travel and deflects the pipeline 102 upwardly to engage the wheel rim.

After passing around the wheel 104, the pipeline 102 must, in general, be at least partially straightened before being launched from the vessel. In this example, pipeline straightening is performed by first and second straightener shoes 172, 174, which comprise further roller track assemblies. The first straightener shoe 172 is located on the opposite side of the pipeline 102 from the wheel rim, downstream from the point where the pipeline 102 leaves the wheel rim in the direction of pipeline travel. The second straightener shoe 174 is located on the opposite side of the pipeline 102 from the first shoe 172, downstream thereof. The two straightener shoes 172, 174 together with the wheel rim itself define a three-point straightening mechanism of a type which is generally well known in the art. This straightening mechanism straightens the plastic bending of the pipeline in the vertical plane induced by the passage of the pipeline around the wheel 104. Any horizontal plastic bending induced by the aligners 162, 164, 166 is removed by the tension on the pipeline 102 as it passes around the wheel 104.

After being straightened, the pipeline 102 passes through an anode application and welding station 177 and a primary clamp/pipe guide 178 before entering the water. In this example, the primary clamp/pipe guide 178 is gimbal-mounted between a pair of guide rails 180 located on the port and starboard sides of the moonpool 106. The pipeline launch angle is variable by moving the primary clamp/pipe guide 178 fore and aft along the guide rails 180.

When the pipeline launch angle is varied from 90°, the point at which the pipeline 102 departs from the wheel rim moves farther round the circumference of the wheel rim (ie the pipeline is diverted through more than 270°). Accordingly, the straightener shoes 172, 174 must also be moved as shown. For this purpose, the straightener shoes 172, 174 may suitably be mounted on a carriage (not shown) adapted to travel around the wheel rim. This is easier to accomplish in a static structure having a peripheral roller or endless belt conveyor than it would be in a wheel which rotates about a central hub.

The degree of possible variation in the pipeline launch angle depends upon the extent to which the wheel 104 is angled relative to the vessel centreline. The shallower the launch angle, the greater becomes the required angle between the plane of the wheel 104 and the vertical plane through the vessel centreline, in order to allow the pipeline to cross itself without clashing. A 6° to 10° wheel offset angle is contemplated, allowing the pipeline launch angle to be varied in a range of the order of 90° to 50°. This corresponds to the pipeline being diverted through an angle in the range 270° to 310° for a stern-launching vessel as illustrated, or 270° to 230° for a bow-launching vessel.

FIG. 12 shows a more detailed example of a possible configuration of the pipe diverter structure 100. The wheel 104 comprises a framework 182 supporting the circular pipeline bearing wheel rim 184. The framework 182 is itself supported by a main truss 186 which is mounted on the deck of the vessel, straddling the moonpool 106. A stairway and/or elevator 188 provides access to the top of the wheel 104, which may be provided with a work platform 190.

The vessel also includes apparatus for "abandonment and recovery" (A&R) of the pipeline 102, which is not illustrated in the present example. This might typically include a carousel located below deck for storage of an A&R cable, which can be passed around the wheel 104 for connection to a free end of the pipeline 102 during A&R operations, and an A&R winch for driving the A&R cable. For large diameter pipelines and high pipeline tensions involved in the type of operations for which the present vessel is particularly intended, the A&R cable might itself comprise a flexible pipeline of known type.

When "abandoning" the pipeline 102, it would be clamped by the primary clamp 178 and cut at a point immediately above the primary clamp 178. The A&R cable would then be connected to clamped end of the pipeline, which may then be unclamped and lowered into the water as required. During recovery operations, the free end of a previously abandoned pipeline would be connected to the A&R cable and pulled up to be clamped by the primary clamp 178, where it would be re-welded to the end of a pipeline passing around the wheel 104 and through the straightener 172, 174, at the welding station 177.

The wheel 104 may preferably include a second circular path (not shown) for passage of the A&R cable alongside the pipeline 102, allowing the pipeline to remain in situ on the wheel during A&R operations. Alternatively, the wheel may include an arrangement of supporting hooks or the like, into which the pipeline might be sprung to allow passage of the A&R cable along the existing pipeline path.

The pipeline tension required for pipelaying operations can be applied in a number of different ways. The tension may be considered in terms of "back tension"; that is, the tension applied to the horizontal pipeline before it engages the wheel 104; and "lay tension"; that is, the tension in the pipeline as it departs from the wheel 104. The lay tension must be maintained at or above a predetermined value to maintain the bending radius of the pipe in the "sag bend region" prior to touch down at or above the minimum value required to prevent yielding of the pipeline.

If the wheel 104 is allowed to idle or "free-wheel", then the full lay tension may be provided by the back tension applied to the horizontal pipe, or by a tensioning mechanism applied to the pipeline after it departs from the wheel. Alternatively, the full lay tension could be applied by a braking force applied to the wheel 104. In practice, it is likely to be desirable to exploit the "capstan effect" created by the passage of the pipeline around the curved pipeline supporting surface of the wheel 104, for which purpose the wheel would have to be driven (or the pipeline braked by other means) and some degree of back tension would always be required. This "capstan effect" could be enhanced by passing the pipeline through multiple turns about the wheel 104 (ie through 630° or more), although this would entail significantly greater mechanical complexity. Combinations of any or all of these alternatives are possible.

Tension may be applied to the pipeline before or after the wheel 104 by any suitable means such as combinations of static and moving clamps as previously discussed in relation to FIG. 6, or caterpillar-track type tensioners of a type which are generally well known in the art. The use of a tensioning mechanism upstream of the second weld station 116 in the direction of pipeline travel is desirable, since this may also be employed in S-lay operations using the conventional stinger 108.

The pipelay vessels described herein are also suitable for the laying of flexible pipelines and small diameter pipelines which may be diverted through the various embodiments of arcuate paths without plastic deformation. In the case of FIGS. 6 and 8 to 12, the curvature imparted by the diverter wheels would match the direction of curvature of the required catenary, as previously discussed in relation to the "over-the-bow" embodiments of FIGS. 2 and 3.

It will be understood that all of the embodiments of the invention described herein might also be applied to pipelines fabricated by methods other than welding; for example, screw-threaded connection systems.

The invention thus makes it possible to conduct the pipe welding operation horizontally on the deck of a vessel while avoiding the limitations of prior art S-lay vessels, and with higher through-put than known J-lay systems.

Modifications may be made to the foregoing embodiments within the scope of the present invention.

We claim:

1. A vessel for use in laying an underwater pipeline, the vessel including a deck area, means on the deck area for aligning pipe sections along a substantially horizontal axis and connecting said pipe sections together to form a pipeline, and means for bending the pipeline to cause it to pass from said horizontal axis to a launch axis having a substantial inclination to the horizontal, wherein said pipeline bending means is adapted to plastically bend the pipeline about a substantially arcuate path in a substantially vertical plane and to bend the pipeline through an angle greater than 90°.

2. The vessel of claim 1, further including means for applying tension to said pipeline.

3. The vessel of claim 2, further including means for controlling said tension to ensure that the bending of the pipeline at the point where it meets the sea bed is within the elastic yield limit of the pipe material.

4. The vessel of claim 1, in which straightening means are provided downstream of said bending means for at least partially removing the bend in the pipeline.

5. The vessel of claim 4, in which said bending means is adapted to bend said pipeline upwardly along a substantially arcuate path and subsequently to bend said pipeline downwardly to a final launch angle.

6. The vessel of claim 5, in which said bending means comprises first bending means for diverting the pipeline upwardly along said substantially arcuate path and second bending means for subsequently diverting the pipeline downwardly to said final launch angle.

7. The vessel of claim 6, wherein said second bending means comprises an adjustable-angle ramp.

8. The vessel of claim 7, wherein said adjustable-angle ramp is located for launching the pipeline from the stern of the vessel.

9. The vessel of claim 7, wherein said adjustable-angle ramp is located for launching the pipeline through a moonpool.

10. The vessel of claim 1, wherein said straightening means is mounted on said variable angle ramp for straightening said pipeline after it has been diverted downwardly to its final launch angle.

11. The vessel of claim 6, further including tensioning means located upstream of said first bending means in the direction of pipeline travel.

12. The vessel of claim 6, wherein said first bending means is adapted to divert the pipeline about a horizontal axis through substantially 180° prior to being launched via said ramp.

13. The vessel of claim 12, in which said first bending means comprises a sheave mounted above the deck area.

14. The vessel of claim 4, including means for feeding the pipeline in a direction from the bow of the vessel towards the stern thereof and wherein said pipeline bending means is adapted to divert said pipeline through a net angle of substantially 270° or greater.

15. The vessel of claim 14, wherein said pipeline bending means is adapted to divert said pipeline through an angle less than or equal to 310°.

16. The vessel of claim 14, wherein said pipeline bending means is adapted to divert said pipeline through an angle greater than or equal to 270° plus an integer multiple of 360°.

17. The vessel of claim 16, said pipeline bending means is adapted to divert said pipeline through an angle less than or equal to 310° plus said integer multiple of 360°.

18. The vessel of claim 14, wherein the pipeline is launched from the side of the vessel.

19. The vessel of claim 14, wherein the pipeline is launched from the stern of the vessel.

20. The method of claim 14, wherein the pipeline is launched via a moonpool.

21. The vessel of claim 5, including means for feeding the pipeline in a direction from the stern of the vessel towards the bow thereof and wherein said pipeline bending means is adapted to diverted said pipeline through a net angle of substantially 270° or less.

22. The vessel of claim 21, wherein said bending means is adapted to divert the pipeline through an angle greater than or equal to 230°.

23. The vessel of claim 21, wherein said pipeline bending means is adapted to divert said pipeline through an angle less than or equal to 270° plus an integer multiple of 360°.

24. The vessel of claim 23, wherein said pipeline bending means is adapted to divert said pipeline through an angle greater than or equal to 230° plus said integer multiple of 360°.

25. The vessel of claim 21, wherein the pipeline is launched from the side of the vessel.

26. The vessel of claim 21, wherein the pipeline is launched over the bow of the vessel.

27. The vessel of claim 21, wherein the pipeline is launched via a moonpool.

28. The vessel of claim 14, wherein said pipeline is diverted by being passed around a pipeline supporting structure defining a substantially arcuate path.

29. The vessel of claim 25, wherein said pipeline supporting structure comprises a substantially circular wheel, said substantially arcuate path extending around the outer rim of said wheel.

30. The vessel of claim 28, wherein said pipeline path is defined by a pipeline bearing roller conveyor or endless belt conveyor.

31. The vessel of claim 28, including means for varying the launch angle of the pipeline by varying the point at which the pipeline departs from said substantially arcuate path.

32. The vessel of claim 28, including straightening means for at least partially straightening said pipeline after it departs from said substantially arcuate path.

33. The vessel of claim 32, further including pipe guide means through which said pipeline passes after being straightened.

34. The vessel of claim 33, wherein said pipe guide means is adapted to be translated in a fore and aft direction so as to vary the launch angle of the pipeline.

35. The vessel of claim 28, including tensioning means for applying tension to the pipeline, located upstream of said pipeline supporting structure in the direction of pipeline travel.

36. The vessel of claim 28, including tensioning means for applying tension to the pipeline, located downstream of said pipeline supporting structure in the direction of pipeline travel.

37. The vessel of claim 28, including means for applying a braking force to said pipeline as it passes around said substantially arcuate path.

38. The vessel of claim 37, wherein said substantially arcuate path is defined by the rim of a rotatable wheel and said braking force is provided by drive means for driving said wheel.

39. The vessel of claim 37, wherein said substantially arcuate path is defined by an endless conveyor and said braking force is provided by drive means for driving said endless conveyor.

40. The vessel of claim 28, in which the plane of said substantially arcuate path is disposed at an angle to the vertical plane including the horizontal pipeline assembly axis, and including alignment means for diverting the pipeline in a horizontal plane into alignment with the plane of said substantially arcuate path prior to the pipeline engaging said substantially arcuate path.

41. The vessel of claim 40, wherein said alignment means is adapted to effect said horizontal diversion prior to said pipeline being diverted upwardly to engage said substantially arcuate path.

42. The vessel of claim 5, including a plurality of parallel stalk fabrication lines in which individual pipe joints may be assembled simultaneously into a plurality of pipe stalks.

43. The vessel of claim 42, including a corresponding plurality of repair lines disposed substantially colinearly with said fabrication lines, and means for transporting assembled pipe stalks in the fore and aft direction of said vessel from said fabrication lines to said repair lines.

44. The vessel of claim 43, further including a plurality of stalk storage areas disposed adjacent to and substantially parallel with said horizontal pipeline assembly axis and means for transporting assembled pipe stalks are transported transversely from said repair lines to said stalk storage areas.

45. The vessel of claim 44, including means for transporting pipe stalks from said stalk storage areas and for aligning said stalks end to end along said horizontal pipeline assembly axis.

46. The vessel of claim 45, including a plurality of work stations for connecting adjacent ends of said stalks and for connecting a first one of said stalks to the free end of the pipeline downstream from said substantially arcuate path in the direction of pipeline travel, substantially simultaneously.

47. The vessel of claim 46, in which said work stations include means for performing non-destructive testing and field-coating of the connections therebetween.

48. The vessel of claim 1, including means for feeding the pipeline in a direction from the stem of said vessel towards the bow thereof and means for diverting the pipeline downwardly through an angle greater than or equal to 90° as it is launched over said bow.

49. The vessel of claim 48, wherein said means for diverting said pipeline comprises a pipeline supporting structure defining a substantially arcuate path, projecting over the bow of the vessel.

50. The vessel of claim 49, including means for varying the point at which the pipeline departs from said substantially arcuate path so as to vary the launch angle of the pipeline.

51. The vessel of claim 49, further including straightening means for straightening said pipeline after it departs from said substantially arcuate path.

* * * * *